UNITED STATES PATENT OFFICE.

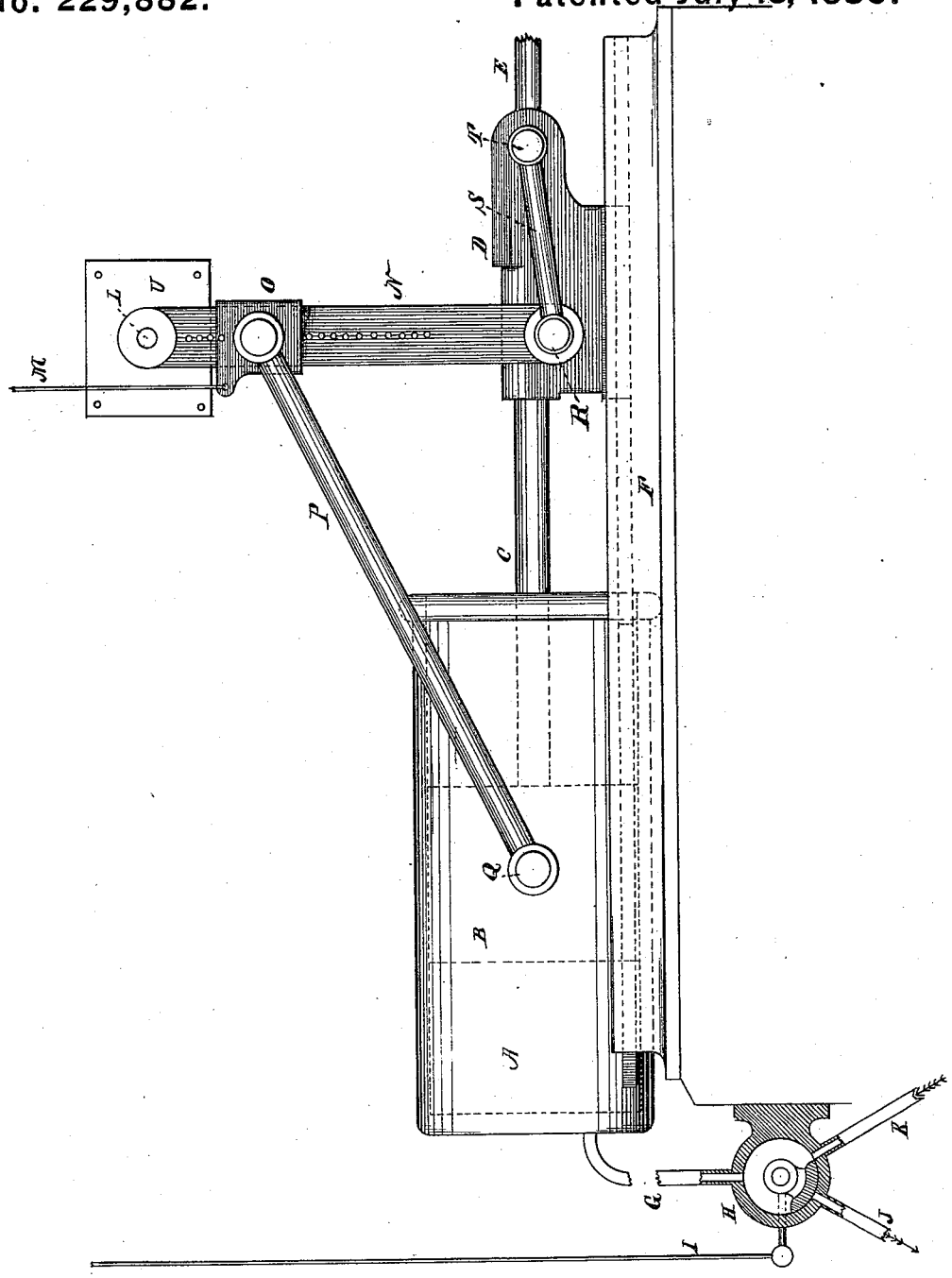

FREDERICK W. GORDON, OF PITTSBURG, PENNSYLVANIA.

HYDRAULIC MOTOR.

SPECIFICATION forming part of Letters Patent No. 229,882, dated July 13, 1880.

Application filed May 25, 1880. (No model.)

*To all whom it may concern:*

Be it known that I, FREDERICK W. GORDON, of Pittsburg, Allegheny county, Pennsylvania, have invented certain new and useful Improvements in Hydraulic Motors, of which the following is a specification.

In the accompanying drawing I exhibit a side elevation, with some parts in section, of a hydraulic motor embodying my improvements.

A is the cylinder, B the piston, C the piston-rod, and D the cross-head. The cylinder is single-acting, and may be open at one end.

E is the connecting-rod, which may be rigidly attached or pivoted to the cross-head. Through this rod the work of the motor is transmitted. The rod may turn a crank or move a weight, or propel the sheave-head of a common rope hoister, or be adapted to any useful work to which the motor is applicable.

H is a valve adapted to admit liquid to the cylinder through pipes K and G, or release liquid from the cylinder through pipes G and J. The valve may be operated by the rod I.

There is nothing peculiar about the valve, and any other suitable valve or combination of valves may be used, care being taken that the inlet and outlet pipes can never both be open at one time.

As thus far described the device is seen to be a common hydraulic motor. Liquid under pressure, being admitted to the cylinder, moves the piston and the load, and upon the release of the liquid from the cylinder the load may return the piston. It will at once be seen that such a motor would require as much liquid to move a light load as to move a heavy one.

To make the cost of moving the load in proportion to the load the practical displacement of the piston should be adjustable with reference to the distance through which the load is moved.

I accomplish this adjustment of displacement by causing the cylinder to partake in a degree of the piston's progressive movement, and thus limit the practical displacement to the difference between the movement of the piston and the movement of the cylinder.

The cylinder A is adapted to slide in the frame F, and partake of the same character of motion as the cross-head D.

The inlet-pipe G should be flexible, to accommodate itself to the motion of the cylinder.

U is a fixed abutment, to which is pivoted the lever N, whose lower end is connected to the cross-head by the link S. The lever N is oscillated by the cross-head.

Upon the lever N is fitted the adjustable block O, as shown. The link P connects this block with the cylinder.

If the block O should be fixed at the top or point of oscillation of the lever N, as at L, the cylinder would have no motion, and the displacement of the piston would be the full measure of its movement. If the block O should be fixed at the point R, the cylinder would have to partake of the full motion of the cross-head. There would be no displacement, and of course no motion. Between these points of no displacement and of full displacement there are points at which the block O may be set which will cause the cylinder to move with the cross-head, but at a less velocity.

The displacement and the consumption of liquid will be measured by the difference between the distances traveled by the piston and cylinder, respectively. The piston may thus make full strokes, while the displacement is caused to be in proper proportion to the work to be done.

Many substitutes can be used for the lever and links shown. Any mechanism will answer which will transmit a portion of the piston's reciprocating motion to the cylinder.

It should be observed that the work of the motor may be done with the inlet-valve wide open, and that the returning motion may be controlled by the release-valve.

The whole object of moving the cylinder being to give motion to the cylinder-head, it is obvious that the proper motion may be imparted to a movable cylinder-head sliding in a fixed cylinder.

I claim as my invention—

The combination, with a piston, a piston-rod, a cross-head, a cylinder-head adapted to partake of the piston motion, a valve and pipes adapted to control the flow of liquid to and from the cylinder, and a fixed abutment, of a mechanism adapted to transmit to the cylinder-head a portion of the piston's reciprocating motion, substantially as set forth.

FRED. W. GORDON.

Witnesses:
JAMES A. MCKEAN,
GEO. W. BOLLMAN.